United States Patent [19]
Kelley et al.

[11] Patent Number: 5,240,266
[45] Date of Patent: Aug. 31, 1993

[54] HITCH FOR ONE-WHEELED TRAILER TO BE TOWED BY TWO-WHEELED VEHICLES

[76] Inventors: Reginald W. Kelley, P.O. Box 165, Bakersfield, Vt. 05441; S. Richard Hazelett, P.O. Box 8, Colchester, Vt. 05446; Bernhard Bender, Bernhardstrasse 18, 4300-Essen-Heidhausen 16 (Werden); Thomas Mulert, Viereichenhöhe 18a, 4300 Essen 1, both of Fed. Rep. of Germany

[21] Appl. No.: 870,815

[22] Filed: Apr. 20, 1992

[51] Int. Cl.$^5$ .............................................. B62K 27/12
[52] U.S. Cl. ................................. 280/204; 280/492; 280/494; 280/515
[58] Field of Search ............. 280/204, 495, 499, 492, 280/494, 515

[56] References Cited

U.S. PATENT DOCUMENTS

| | | | |
|---|---|---|---|
| 3,787,065 | 1/1974 | Grimm | 280/204 |
| 3,829,125 | 8/1974 | Davis | 280/204 |
| 4,306,733 | 12/1981 | Cox | 280/204 |
| 4,371,184 | 2/1983 | Henden et al. | 280/204 |
| 4,413,835 | 11/1983 | Hazelett | 280/204 |
| 4,883,283 | 11/1989 | Hazelett et al. | 280/204 |
| 4,928,985 | 5/1990 | Nowlin | 280/204 |
| 5,020,813 | 6/1991 | Gottschalk | 280/204 |
| 5,067,738 | 11/1991 | O'Connor | 280/204 |

FOREIGN PATENT DOCUMENTS 17406 of 1900 United Kingdom ................ 280/204

*Primary Examiner*—Margaret A. Focarino
*Assistant Examiner*—Kevin Hurley

[57] ABSTRACT

A hitch to be used with a one-wheeled trailer to be towed by a bicycle, motorcycle, moped, or other cycle or two-wheeled vehicle. The hitch is mounted relatively permanently to the seat post of the towing cycle but is free to swivel around said seat post as the trailer tracks around curves. The frame of the trailer to be towed has a frame the front reach of which consists of transversely disposed rounded bar or tubing. The essential universal-joint connection that makes a one-wheeled trailer feasible is completed by this rounded front reach of the frame captured rotatably within a horizontally disposed, rearward-facing slot in the hitch block. The capture is completed by means of a vertical, quickly removable pin preferably containing a spring-ball plunger. The pin is inserted behind said bar or tubing. The invention enables the hitching and towing of a trailer while leaving the trailer free to track around curves and over rough roads and paths, yet at the same time keeping the trailer normally upright by preventing its rotation around a longitudinal axis unless the cycle tilts or falls over with it. The bearing surfaces are normally lined with inserts of polyamide (nylon) strip or other bearing-quality material. These bearing linings prevent undue wear, scuffing and rattling.

9 Claims, 4 Drawing Sheets

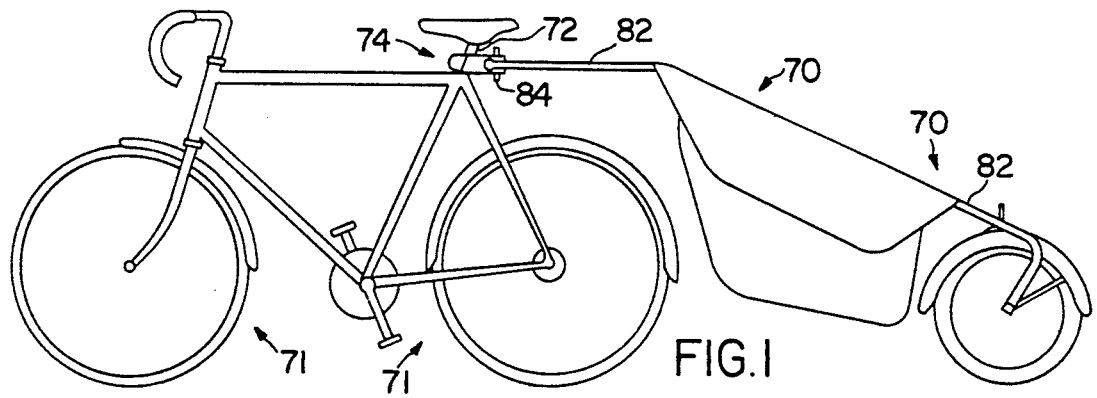
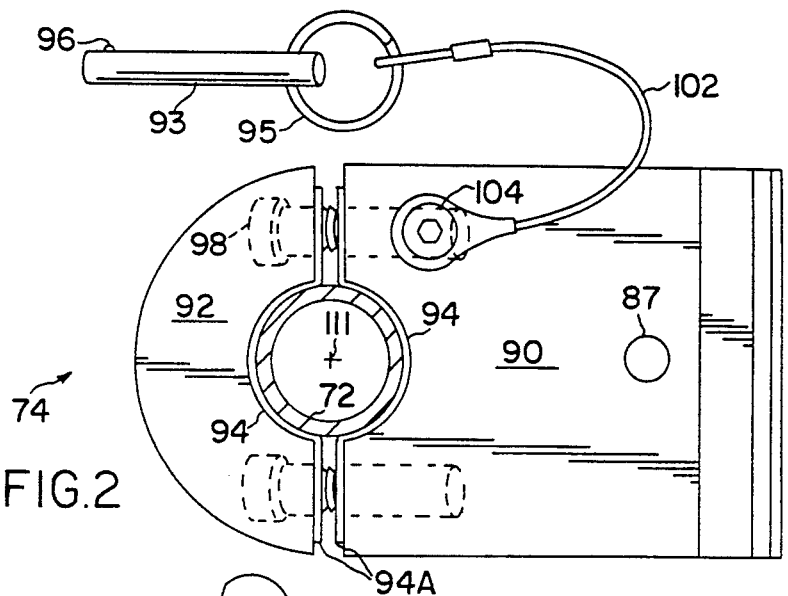
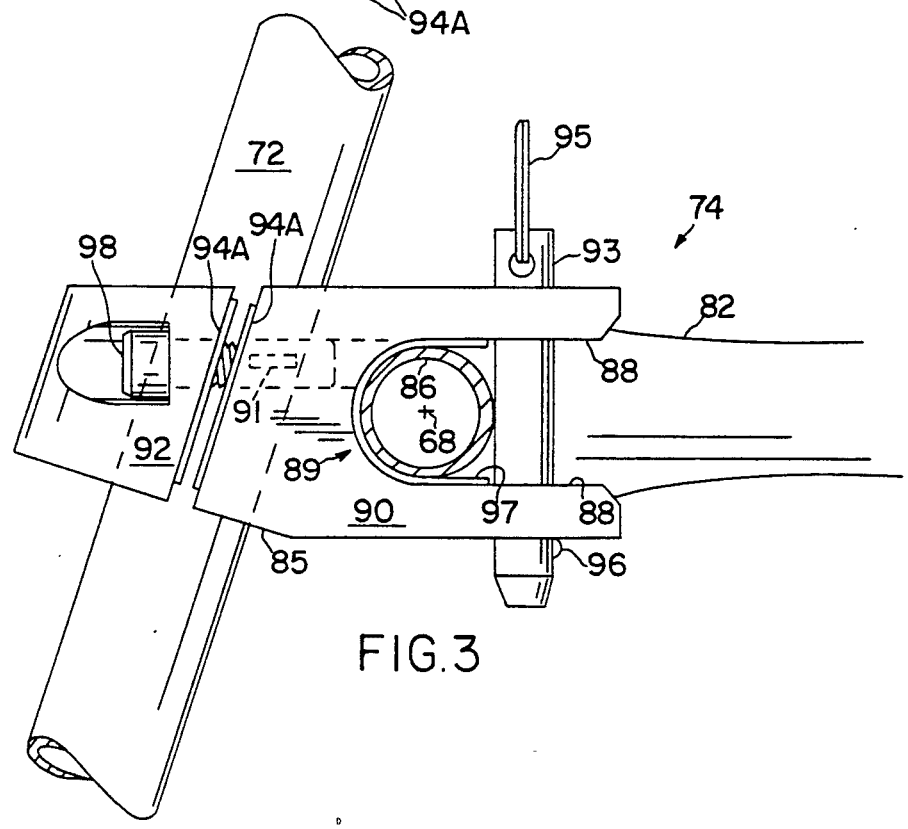

HITCH FOR ONE-WHEELED TRAILER TO BE TOWED BY TWO-WHEELED VEHICLES

BACKGROUND OF THE INVENTION

Inventions of universal-jointed cycle trailer hitches for one-wheeled trailers were disclosed by Hazelett in U.S. Pat. No. 4,413,835 and by Hazelett, Bender, and Savage in U.S. Pat. No. 4,883,283. The hitches there described have proven highly serviceable. Together with a suitable one-wheeled trailer as described in the aforesaid patents, these universal-jointed hitches have proven readily capable of safely hauling cargoes of up to 40 kilograms or about 90 lbs, when attached to a typical bicycle. Moreover, universal-joint hitches do not permit the trailer to fall over unless the normally-upright bicycle also falls over.

However, the earlier of our prior-art hitches requires to be clamped high on the rear fork of the towing bicycle, an area now often occupied by brakes or by pannier-rack attaching lugs. Moreover, these prior-art hitches have been expensive to manufacture.

In the design of these prior-art hitches, no use was made of the pivoting capability of the seat post 72 of the bicycle. The current commercial range of seat posts includes many diameters from 30 to 24 millimeters. To make use of the seat post for attachment appears at first to require a great variety of sizes of hitch assembly that would be pivoted around it. Such a variety of parts would be difficult to stock and sell, especially if sold through the mail, since each bicycle seemingly would require individual fitting from a considerable selection of parts which would require to be stocked ready for sale and which would be hard for the customer to specify when remote from the source of parts.

Moreover, it was formerly thought necessary that the swivelling of the trailer, in order to conform to curves in the road, must take place around an approximately vertical axis, not around the bicycle seat post 72, which points backward from the vertical at an angle of 18 degrees more or less. This backward-pointing of the seat post would entail that the trailer, when pivoted to it, would be similarly tilted right to left when in a right-angular position as in FIG. 9—that is, tilted to a trailing angle of 18 degrees, like the angle of the seat post. With a 45-degree trailing angle as shown in FIG. 8, the tilt would be about 0.7 times 18 degrees or about 12½ degrees. Such angles of tilt right to left would indeed be unacceptable if they occurred while one rides the bicycle at much more than a walking speed.

SUMMARY OF THE INVENTION

To our surprise, we have found that the tilt angles of the trailer that arise as described above are not at all unacceptable in practice, because the actual riding situation is rather like that depicted in FIG. 7, with a trailing angle between bicycle and trailer of only 10 degrees. At this angle, the tilt of the trailer is only about 3 degrees, which is acceptable. This discovery has enabled the devising of a hitch that is much simpler to make and to use than heretofore. Accordingly, the seat post is used as a bearing journal. A backward-facing U-slot in the hitch when suitably lined proves sufficient to serve as the other bearing of the universal-joint connection.

We have devised a bearing arrangement that accommodates a wide range of seat-post diameters by means of adding or subtracting bearing strips or shims. This is used in combination with slightly noncircular bearing backup members. The use of plastic parts deadens rattling noises.

BRIEF DESCRIPTIONS OF THE DRAWINGS

FIG. 1 is a side elevation showing a bicycle hitched with the presently disclosed hitch to a one-wheeled trailer.

FIG. 2 is a top view of the hitch seen from along the axis of the seat post. The view is sectioned through the post.

FIG. 3 is a side elevation of the hitch from the left side. The near side of the trailer frame has been sectioned away in this view.

DETAILED DESCRIPTION OF THE INVENTION

Figure 4:
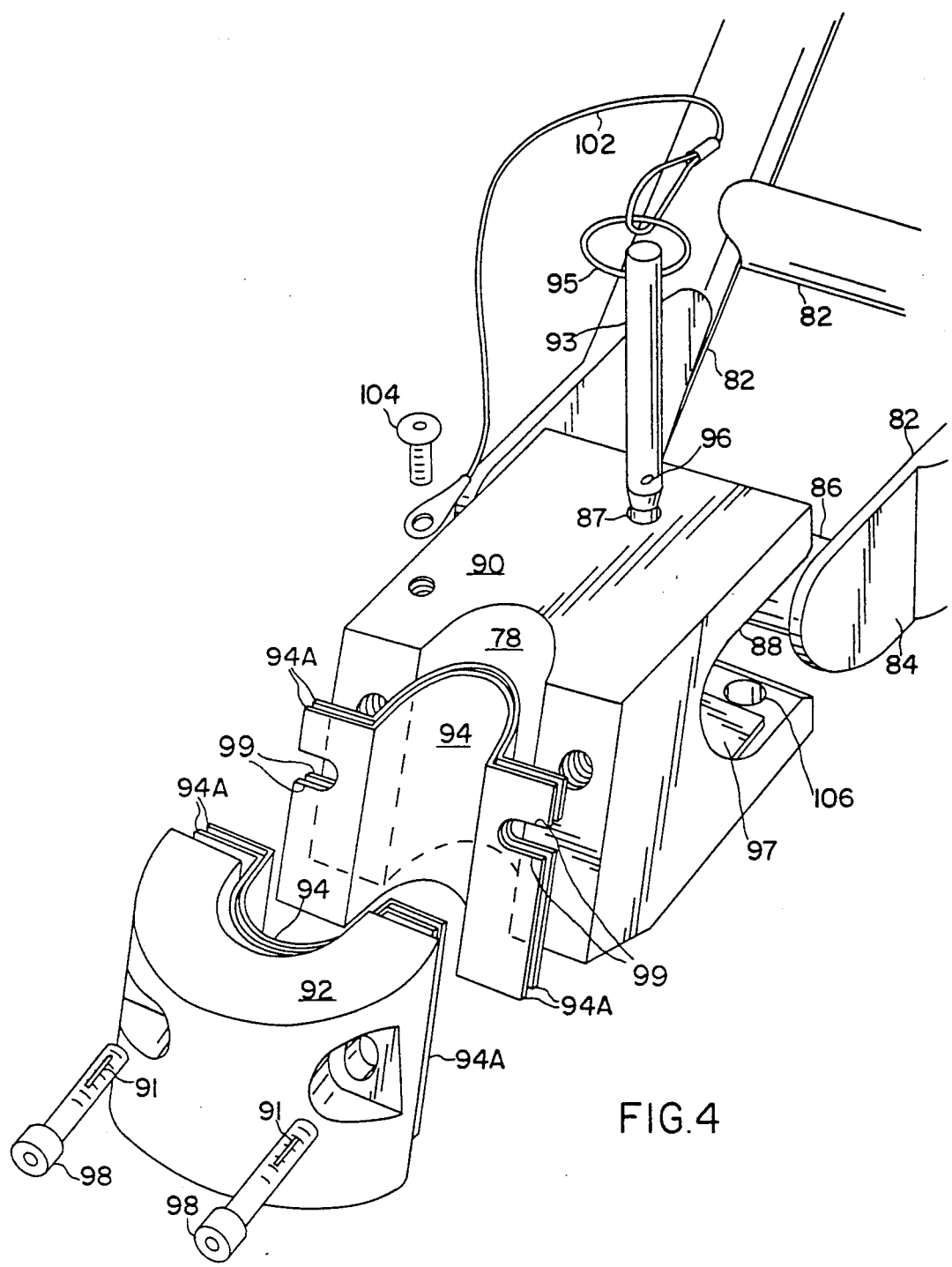
FIG. 4 is an oblique exploded view of the hitch from above the front of the left side of the trailer. The seat post is omitted.

The invention will be described in terms of a preferred configuration, with a trailer 70 towed by a bicycle 71 as shown in FIG. 1.

The abstract functioning of the hitch generally indicated at 74 is that of a universal-joint connection, utilizing two crossed pivot axes. The hitch 74 is mounted relatively permanently around the seat post 72 of the towing cycle 71, the axis of which post 72 is the vertically tending pivotal axis 111. The hitch surrounds and defines split hole 78, about half of the hole being indented into the block 90 and about half of it into the cap 92. The hitch is arranged to be free to swivel snugly around seat post 72 when the trailer 70 and bicycle 71 track around curves.

The trailer 70 being towed has a frame 82 the forward reach 86 of which consists of a rounded member of bar or tubing, which defines the horizontal pivoting axis 68. This rounded front forward reach 86 of the frame 82 is captured within a transverse, horizontally disposed, rearward-facing slot 88 within the hitch block 90, which block is preferably made of aluminum alloy, as is also the cap 92. This assembly affords the needed high torsional rigidity. The capture is completed by a movable blocking device, preferably a vertically disposed, quickly removable round pin 93 comprising commercial spring-ball detent assembly 96, the pin 93 being inserted behind said bar or tubing 86 through holes 87 in block 90. The diameter of the pin 93 when made of plastic may be 16 millimeters or ⅝ inch. The pin is preferably made of plastic in order to deaden the rattling noise which would occur with a metal pin fitted to a usable loose clearance in holes 87. The trailer frame 82 remains free to rotate about a transverse horizontal axis in response to undulations or bumps in the terrain over which the bicycle 71 and trailer 70 are operated. Protruding flattened lugs 84 of the tubular trailer frame 82 capture the frame sideways and are welded or screwed to bar or tube 86. The lower slanted surface 85 of block 90 is a thrust surface which normally bears against the top of the frame of the bicycle.

The rounded bearing surfaces are lined with inserts of plastic of a quality suitable for bearings, such as polyamide (nylon) sheet consisting in part of a finely divided dry lubricant, preferably molybdenum disulfide (Penn Fibre [Philadelphia]0 or Polymer Corp. [Reading, Pa.]) but alteratively notably graphite or fluorine-containing resin. These plastic bearing linings are each typically 0.6 mm (0.025 inch) in thickness. As bearings, they prevent undue wear, scuffing and rattling. In the slot 88 of block 90 they conform to the outside diameter of the bar or tube 86. The plastic strip 97 which lines the rounded portion 89 of the slot 88 in the block 90 may be secured in position with epoxy cement. The glue should be allowed to set while being confined by a fixture which exerts pressure toward the rounded area 89. At the periphery of the seat post 72 which acts as a nonrotating journal, such thin plastic strips 94 conform to the diameter of the seat post. These strips or pieces may be held in place through integral tabs 54A which enable said strips to be captured through slots 99 by the screws 98 that unit the hitch block 90 and the cap 92. The tabs 94A are bent into position through heating in a suitable two-piece die to around 220° C. (430° F.) in the case of the polyamide (nylon) we have used. The heating should be completed quickly lest the plastic become brittle. There are one or two strips or shims 94 on each side of the split, accommodating seat posts 72 of varying diameters. One strip 94 per side functions as a bearing; the other of each pair as a spacer for the smaller seat posts. Similar strips wrapped to be configured as bushings (which are not shown) may be used in place of shim-like strips 94. The strips 94 and 97 may conceivably be made of cuprous or tin-bearing metal alloy or other suitable bearing metal, though there has been no reason yet to do so. Collectively, such materials together with suitable plastics are further referred to herein as "bearing-quality material." As yet another option, the block 90 can be made of solid plastic such as acetal or polyamide (nylon), in which case strip 97 otherwise needed as a horizontal bearing would not be required, nor would one pair of the two pairs of the shim-like strips 94—the pair which acts as a bearing.

Figure 5:
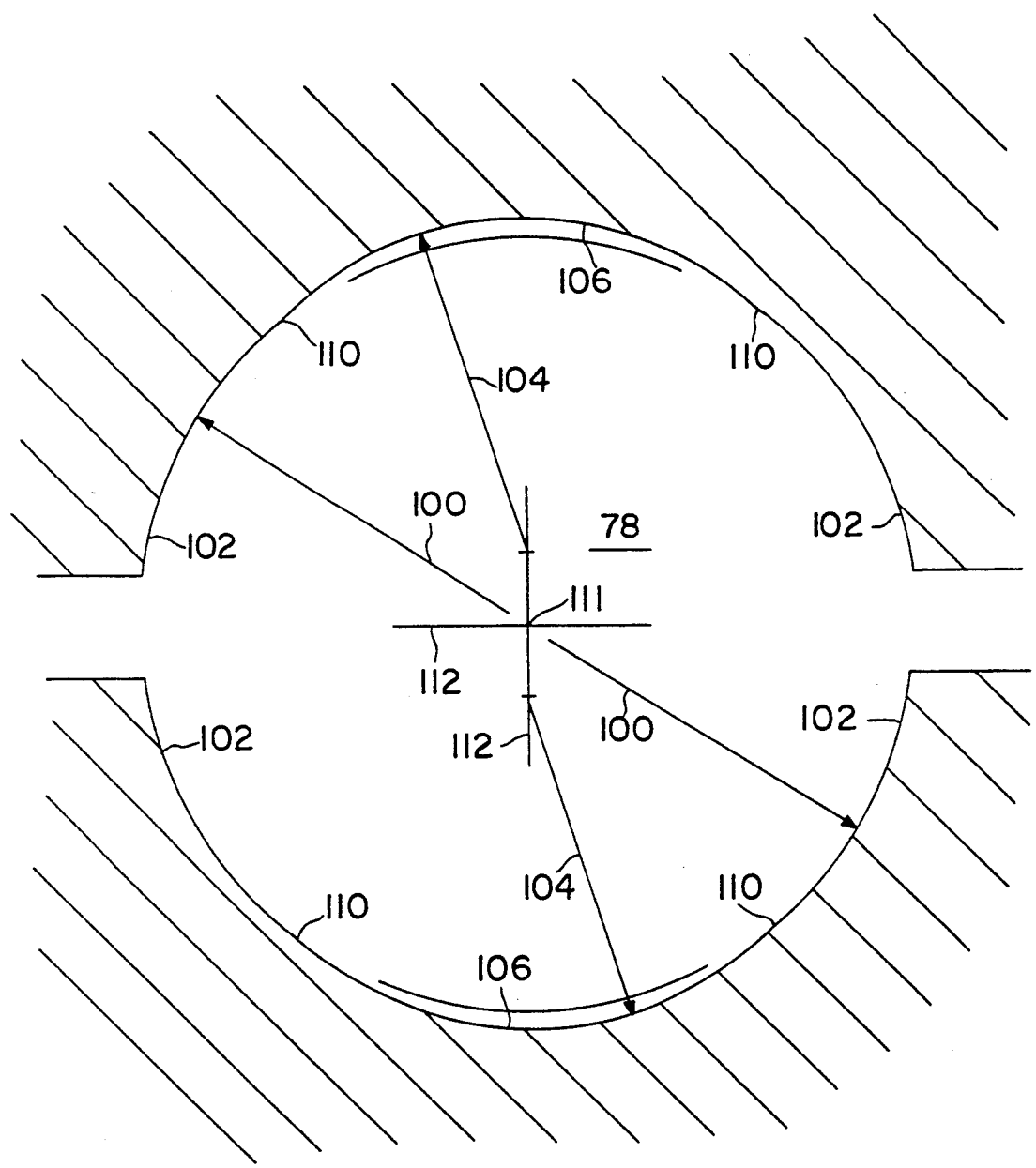
FIG. 5 is an enlarged top cross-sectional view of the seat-post area of the hitch block and cap, viewed from along the axis of the seat post, revealing the dual radii of the hole for the seat post. The difference between arc diameters is shown as exaggerated.
Figure 6:
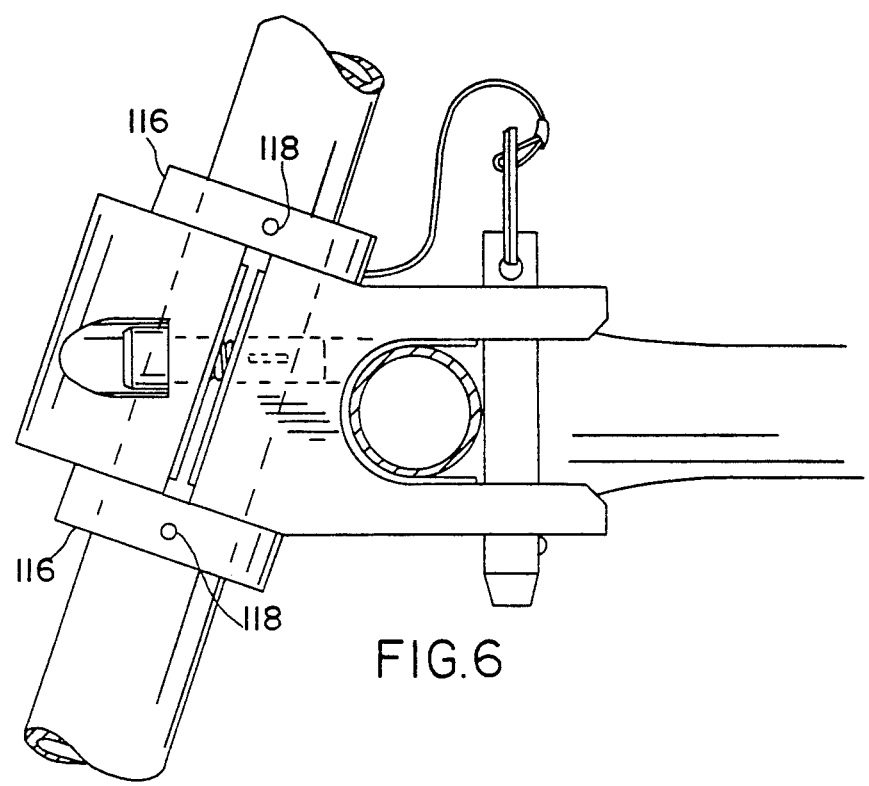
FIG. 6 is similar to FIG. 3 except that position-limiting collars are included.

The split swivel-bearing mounting hole 78 in either the block 90 or the cap 92 is generally not a simple circular arc but something more complicated. That is, the two halves of the hole 78 are each subtly non-circular as a whole, in order to accommodate a range of diameters of cylindrical seat posts 72, as shown in FIG. 5. In the preferred form of the invention, cylindrical surfaces or sectors of two different radii are incorporated into at least the block 90 defining one side of the mounting hole 78 and preferably into the cap 92 also, which defines the other side of the hole 78. The radius 100 of the basic cylindrical sectors 102 is, at the minimum, to be the largest-accommodated radius of the variety of posts 72 to be accommodated, adding to this radius dimension one thickness of the plastic bearing strip or shim 94. This fit secures block 90 securely against rotation about a generally horizontal axis in relation to the seat post 72.

The middle indented cylindrical sector 106 of shorter radius 104 cut into block 90 similarly accommodates a seat post 72 of the shortest radius to be accommodated while at the same time securing the block 90 and hence trailer 80 from unwanted rotation about a generally horizontal axis. The radius 104 is, at a maximum, the radius of the smallest seat post to be accommodated, adding to this radius dimension one thickness of the plastic bearing strip or shim 94. In-between diameters of seat posts 72 are suitably captured by being touched at four places 110 where the cylindrical sectors of differing radii intersect on the line 110 running vertically to the paper, the angle of intersection being only a small mutual angle—two points on block 90 and preferably two similar points on cap 92. The cylindrical sectors of radius 104 are cut to a depth that makes the four points 110 to occur at angles of roughly 45 degrees from the orthogonal axes 112 with intersect at central point 111. In accommodating the intermediate diameters of seat posts 72, the shallow profile around the four contact lines 110 so formed enables the plastic bearing strips 94 to endure long-term use while preventing rotation of the block 90 and trailer 80 about a generally horizontal axis. Along with the varying number of strips 94, only two standard commercial variations of the hole 78 in block 90 and cap 92 are needed to accommodate the full range of needed diameters. At present, one variation covers seat-post diameters from 25 to 27.5 mm, the other form 27.5 to 30 mm. Seat posts from 25 to 24 millimeters diameter are accommodated by the addition of a longitudinally split metallic bushing (not shown). Some other roughly similar shapes of slightly non-circular holes 78 than that described above may accommodate almost equally well the varying diameters of seat posts 72.

The screws 98 which unite block 90 and cap 92 should not be tightened beyond mere snugness, lest they prevent the required swiveling in response to tracking around curves. Overtightening could also dent the seat post. Hence, these screws 98 must be prevented from working loose in some other way than by being tightened down. We employ inserts 91 of polyamide (nylon) in the screws. These inserts protrude above the threads and so maintain a secure connection however adjusted.

A lanyard 102 of thin metallic, plastic-covered cable keeps the pin 93 from being lost. Its springiness also assists in preventing rattling of the removable pin 93. The lanyard is secured with a cap screw 104. A padlock (not shown) may be inserted through either of holes 106, thereby preventing removal of the trailer 70 from the hitch 74. The diameters of these holes are chosen to enable the rounded hasp end of a padlock to become wedged in them, thereby preventing rattling.

A collar 114 may be added to fix the height of the hitch 74 at other than the lowest level if desired by the customer. Another collar 116 may serve to prevent vertical bounce and fretting of the hitch 74 on the seat post 72. Arguably, this would add to safety by preventing entanglement of the trailer with the springs under the seat. However, the experience to date suggests that, when the screws 98 are tightened with proper snugness, block 90 and cap 92 are compressed tightly enough against the seat post 72 by the screws 98 to prevent vertical bouncing and fretting. Nevertheless, the use of collar 116 remains a live option. Setscrews 118 secure them.

A two-legged bicycle kickstand (not shown) is recommended to be used when the trailer is used.

RESULTS OF THE INVENTION

Figure 7:
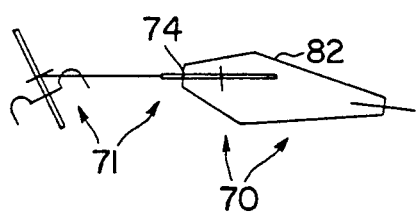
FIG. 7 is a schematic view from above of a bicycle and one-wheeled trailer encountering a normal curve at normal speed.
Figure 8:
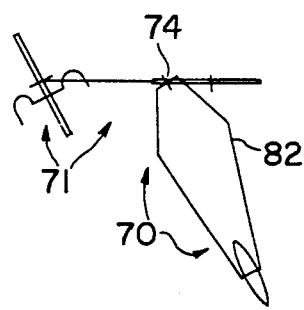
FIG. 8 is a schematic view from above of a bicycle and one-wheeled trailer in a partly jacknifed position.

While the bicycle is being ridden normally and while the trailer is attached to a seat post slanting backward at a normal angle, the trailing angle with respect to the towing bicycle is seldom more than 10 degrees as in FIG. 7—not great enough to make the right-to-left tilt angle of the trailer problematical as that angle is then only about 3 degrees.

Figure 9:
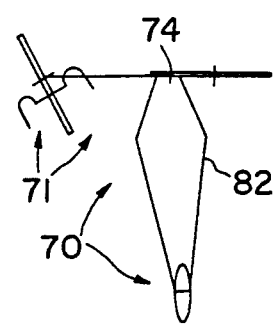
FIG. 9 is a schematic view from above of a bicycle and one-wheeled trailer when the trailer is disposed at a trailing angle of 90 degrees from the bicycle.

Admittedly, the situation is different when the bicycle is being walked and turned sharply at short radii. Then the angle that the trailer makes with the bicycle as seen from above may be as large as 90 degrees as in FIG. 9, resulting in a tilt of the trailer fully as much as the backward angle of the seat post—18 degrees for a seat post inclined 18 degrees. However, this is a trivial problem at most, since the bicycle is not being ridden and no speed is then involved. Hence, to allow the trailer to swivel about the seat post as in the present invention—i.e., about an axis which includes backward not greatly more than 18 degrees from the vertical—is a useful principle.

The result of such a universal-joint hitch 74 is to enable the towing of a trailer 80 by a cycle while leaving the trailer free to track around curves and over rough roads and paths, yet at the same time keeping the trailer normally upright by preventing its rotation or tipping around a longitudinal axis unless the cycle tips or falls over with it. This universal-jointed hitch has proven readily capable of safely hauling cargoes of up to 40 kilograms or about 90 lbs. when attached to a typical utility, touring, or mountain bicycle. Racing bicycles are not recommended for such loads. As with other universal-joint hitches, the hitch does not permit the trailer to fall over unless the normally-upright bicycle also falls over.

The manufacturing cost of the newly invented hitch is only a fraction of that of related prior-art hitches. It can be mounted to almost any bicycle.

An unsought advantage is the almost complete freedom of turning radius when the bicycle and trailer are being walked or parked. With the present invention, the assembly of bicycle and trailer when not in motion can be "jacknifed" such that the rear of the trailer points almost forward. This feature is convenient for parking in confined places.

Anyone who would build a trailer for use behind a powered vehicle such as a motorcycle is advised to be very careful about dynamic stability at high speeds. Any torsional flexibility about a longitudinal axis, with the flexibility occurring anywhere in the assembly, can create such a problem. Many years ago in this development, we tried a frame which was torsionally highly flexible inasmuch as it lacked a rear transverse strut that would rigidify the relationship between the two side tubes of the trailer frame. That trailer became unstable when one of the inventors coasted rapidly down a long hill. Nothing like this has again occurred in our experience, which has been confined to bicycles. Torsional rigidity of both hitch ad frame, together with a suitable anti-sway bar in the flexible hanging cargo bag, forestalls the problem. The bag and the strut are described in the referenced U.S. patents.

Although a specific presently preferred embodiment of the invention have been disclosed herein in detail, it is to be understood that the example has been described for purposes of illustration. This disclosure is not to be construed as limiting the scope of the invention, since the described apparatus may be changed in details by those skilled in the art, in order to adapt this apparatus to various requirements without departing from the scope of the following claims.

We claim:

1. In conjunction with a one-wheeled trailer adapted to be towed behind a two-wheeled towing vehicle such as a bicycle, motorcycle, or moped and secured to the seat post thereof, said towing vehicle having a normally upright position with said trailer normally being in an upright position directly behind and in longitudinal alignment with said towing vehicle, said trailer comprising a trailer frame which frame comprises a front transverse reach of rounded material, the trailer hitch apparatus comprising a block and a cap connected by removable fastening means which together between them about equally define a split hole, whereby said seat post is captured so as to constitute a nonrotating journal about which said block and said cap are free to pivot, the hitch being further characterized in that said block is placed behind said seat post and defines within itself a horizontally disposed, rearward-facing slot which partially captures said rounded front reach of said tailer frame, said capturing being completed on the rearward side of said front reach of trailer frame by means of a movable blocking device, said capture allowing said front transverse reach of said trailer frame to rotate about a generally transverse horizontal axis.

2. The apparatus as claimed in claim 1, further characterized in that at least one piece of thin material is interposed between said seat post and said block-and-cap assembly.

3. The trailer hitch apparatus as claimed in claim 2, in which said thin material comprises mainly polyamide plastic.

4. The trailer hitch apparatus as claimed in claim 3, in which said thin polyamide pieces comprise a finely divided dry lubricant.

5. The apparatus as claimed in claim 1, further characterized in that said block comprises bearing-quality material.

6. The apparatus as claimed in claim 1, further characterized in that at least one side of said split hole comprises a plurality of generally cylindrical sectors of a plurality of radii.

7. The apparatus as claimed in claim 6, further characterized in that at least one side of said split hole comprises three intersecting cylindrical sectors of two different radii.

8. The apparatus as claimed in claim 1, in which said movable blocking device is a plastic round pin.

9. The apparatus as claimed in claim 1, with the additional feature of a collar secured to said seat post in such position as to limit the position of said hitch along said seat post.

* * * * *